(12) United States Patent  
Enoki et al.

(10) Patent No.: US 9,174,557 B2  
(45) Date of Patent: Nov. 3, 2015

(54) VEHICLE SEAT

(75) Inventors: Koichi Enoki, Susono (JP); Masahide Sawada, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 3 days.

(21) Appl. No.: 14/002,038

(22) PCT Filed: Mar. 1, 2011

(86) PCT No.: PCT/JP2011/054625  
§ 371 (c)(1),  
(2), (4) Date: Aug. 28, 2013

(87) PCT Pub. No.: WO2012/117521  
PCT Pub. Date: Sep. 7, 2012

(65) Prior Publication Data  
US 2013/0334847 A1    Dec. 19, 2013

(51) Int. Cl.  
*B60N 2/42* (2006.01)  
*B60N 2/72* (2006.01)  
*B60N 2/427* (2006.01)

(52) U.S. Cl.  
CPC .......... *B60N 2/4228* (2013.01); *B60N 2/42709* (2013.01); *B60N 2/72* (2013.01)

(58) Field of Classification Search  
CPC .................. B60N 2/42709; B60N 2/42745  
USPC ......................... 297/216.13, 216.14  
See application file for complete search history.

(56) References Cited

U.S. PATENT DOCUMENTS

| | | | |
|---|---|---|---|
| 7,540,563 B2* | 6/2009 | Ogawa et al. | 297/216.13 |
| 8,696,061 B2* | 4/2014 | Kasama et al. | 297/216.14 |
| 8,708,411 B2* | 4/2014 | Nakamura et al. | 297/284.4 |
| 2002/0030392 A1 | 3/2002 | Kitagawa | |
| 2005/0077763 A1* | 4/2005 | Kawashima | 297/216.14 |
| 2007/0085390 A1* | 4/2007 | Kawashima et al. | 297/216.13 |
| 2009/0108646 A1* | 4/2009 | Chida et al. | 297/216.13 |
| 2011/0121623 A1* | 5/2011 | Okamoto et al. | 297/216.14 |

FOREIGN PATENT DOCUMENTS

| | | |
|---|---|---|
| JP | 7-291005 A | 11/1995 |
| JP | 2001-253281 A | 9/2001 |
| JP | 2002-2342 A | 1/2002 |
| JP | 2004-148942 A | 5/2004 |

* cited by examiner

*Primary Examiner* — David R Dunn  
*Assistant Examiner* — Alexander Harrison  
(74) *Attorney, Agent, or Firm* — Sughrue Mion, PLLC

(57) ABSTRACT

An S-spring 14 is provided in a state of tension between a pair of seat back frames 10 constituting a vehicle seat 1. A support section 16a of a bracket 16 fixed to the seat back frame 10 supports a part of an end of the S-spring 14 from behind. The support section 16a is formed with a length equal to or greater than one pitch of the S-spring 14 in a no-load state and discontinuously supports center portions α of the S-spring 14. When a load equal to or greater than a predetermined level acts on the S-spring 14, the S-spring 14 is stretched to cause the center portions α to be dislocated from the support sections 16a, and as a result, the length of a deflectable portion of the S-spring 14 is changed.

5 Claims, 11 Drawing Sheets

VEHICLE SEAT

CROSS REFERENCE TO RELATED APPLICATIONS

This application is a National Stage of International Application No. PCT/JP2011/054625, filed on Mar. 1, 2011, the contents of all of which are incorporated herein by reference in their entirety.

TECHNICAL FIELD

The present invention relates to a vehicle seat mounted in a vehicle.

BACKGROUND ART

Generally, a vehicle seat is configured such that plural S-springs are fixed to a seat back frame. The S-springs elastically support an occupant. Therefore, the vehicle seat supports the back (shoulder blade) and the lumbar vertebra region of the occupant with the S-springs.

As this kind of vehicle seat, Japanese Unexamined Patent Application Publication No. 2001-253281 discloses a technology in which coupling members that couple S-springs with a seat back frame can be moved backward along slots formed in the seat back frame.

In addition, Japanese Unexamined Patent Application Publication No. 07-291005 discloses a technology of using coupling members, which extend backward, as a coupling member that couples S-springs with a seat back frame.

Citation List

Patent Literature

[Patent Literature 1] Japanese Unexamined Patent Application Publication No. 2001-253281
[Patent Literature 2] Japanese Unexamined Patent Application Publication No. 07-291005

SUMMARY OF INVENTION

Technical Problem

However, the technologies disclosed in Japanese Unexamined Patent Application Publication No. 2001-253281 and Japanese Unexamined Patent Application Publication No. 07-291005 have a problem in that the structure is complicated. Further, in the technologies disclosed in the latter parts of the patent literatures, since the characteristics of S-springs themselves are not changed, there is a room for improvement from the viewpoint of improving the characteristics of a seat at the time of a rear collision.

Here, an object of the invention is to provide a vehicle seat capable of changing the characteristics of an S-spring at the time of a rear collision.

Solution to Problem

According to an aspect of the invention, there is provided a vehicle seat which is mounted in a vehicle including: a pair of seat back frames that face each other; an S-spring that is bent in an S-shape and held by the seat back frames to elastically support an occupant of the vehicle; and a spring support section that supports the S-spring from the rear side of the vehicle and in which a support position of the S-spring is changed according to a load.

In the vehicle seat according to the aspect of the invention, the support position of the S-spring is changed by the spring support member according to a load. Accordingly, since a deflectable portion of the S-spring, which is subjected to the load of the occupant and stretched, is changed, the characteristics of the S-spring can be changed. In this manner, since the characteristics of an S-spring are changed by the spring support member, the occupant can be supported with different supporting force in a normal state and at the time of a rear collision.

In this case, when the load is increased, it is preferable that the spring support section be changed to widen the support position of the S-spring in a width direction of the vehicle seat.

In this configuration, when the load is increased, the deflectable portion of the S-spring, which is subjected to the load and stretched, is lengthened. Accordingly, in comparison with a case in which a load is small, the back (shoulder blade) and the lumbar vertebra region of the occupant are moved deeply into the vehicle seat and the occupant can be comfortably supported.

In this case, it is preferable that the spring support section be formed to have a length of equal to or greater than one pitch of the S-spring in a no-load state and discontinuously support a center portion of the S-spring.

In this configuration, when a load equal to or greater than a predetermined level acts on the S-spring at the time of a rear collision, the S-spring is stretched to cause the center portion of the S-spring to be dislocated from the spring support section, and as a result, the deflectable portion (or free length) of the S-spring that can be displaced to the rear side of the vehicle is lengthened by one pitch. Accordingly, since the displacement amount of the S-spring with respect to the load is increased, and the back (shoulder blade) and the lumbar vertebra region of the occupant are moved deeply into the vehicle seat, the burden on the occupant at the time of a rear collision can be reduced.

In addition, it is preferable that the spring support section be an approximately L-shaped (L-shaped) bracket fixed to the seat back frame and the spring support section include a support section that is fixed to the seat back frame and supports the S-spring from the rear side of the vehicle, and a guide section that extends and curves to the rear side of the vehicle from a tip end of the support section.

In this configuration, the center portion of the S-spring can be reliably supported by the support section. Further, even when a load equal to or greater than a predetermined level acts on the S-spring like at the time of a rear collision, and the center portion of the S-spring is dislocated from the support section, the center portion can be smoothly returned to the original position by the guidance of the guide section.

In addition, it is preferable that the back frame be formed to have an approximately U-shaped cross section (U-shaped cross section) which is opened toward an inside, and the spring support section be accommodated in the back frame.

In the configuration, since interference between the occupant and the bracket 16 can be prevented, deterioration in comfortable riding can be prevented.

Advantageous Effects of Invention

According to the aspects of the invention, the characteristics of the S-spring can be changed at the time of a rear collision.

DESCRIPTION OF EMBODIMENTS

Figure 1:
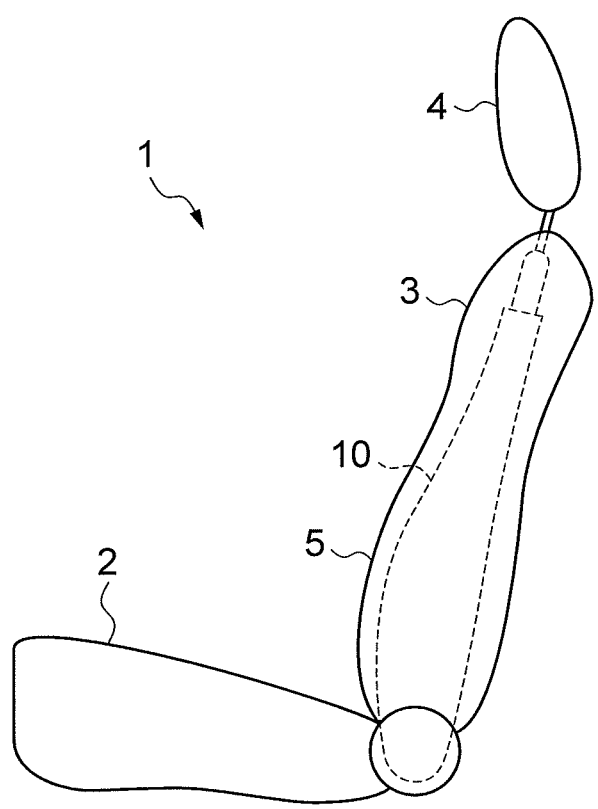
FIG. 1 is a side view of a vehicle seat according to an embodiment.

Hereinafter, a preferred embodiment of a vehicle seat according to the invention will be described in detail with reference to the drawings. In all drawings, the same or corresponding elements will be denoted by the same reference numerals. Further, in the following description, front, rear, left and right directions refer to the front, rear, left and right directions of a vehicle in which the vehicle seat is provided.

FIG. 1 is a side view of a vehicle seat according to an embodiment. As shown in FIG. 1, a vehicle seat 1 includes a seat cushion 2 that supports the buttocks and the femoral region of an occupant and the like, a seat back 3 that supports the back (shoulder blade) and lumbar vertebra region of the occupant and the like and a head rest 4 that supports the head of the occupant. In addition, the surfaces of the seat cushion 2, the seat back 3 and the head rest 4 are covered with a seat pad 5.

Figure 2:
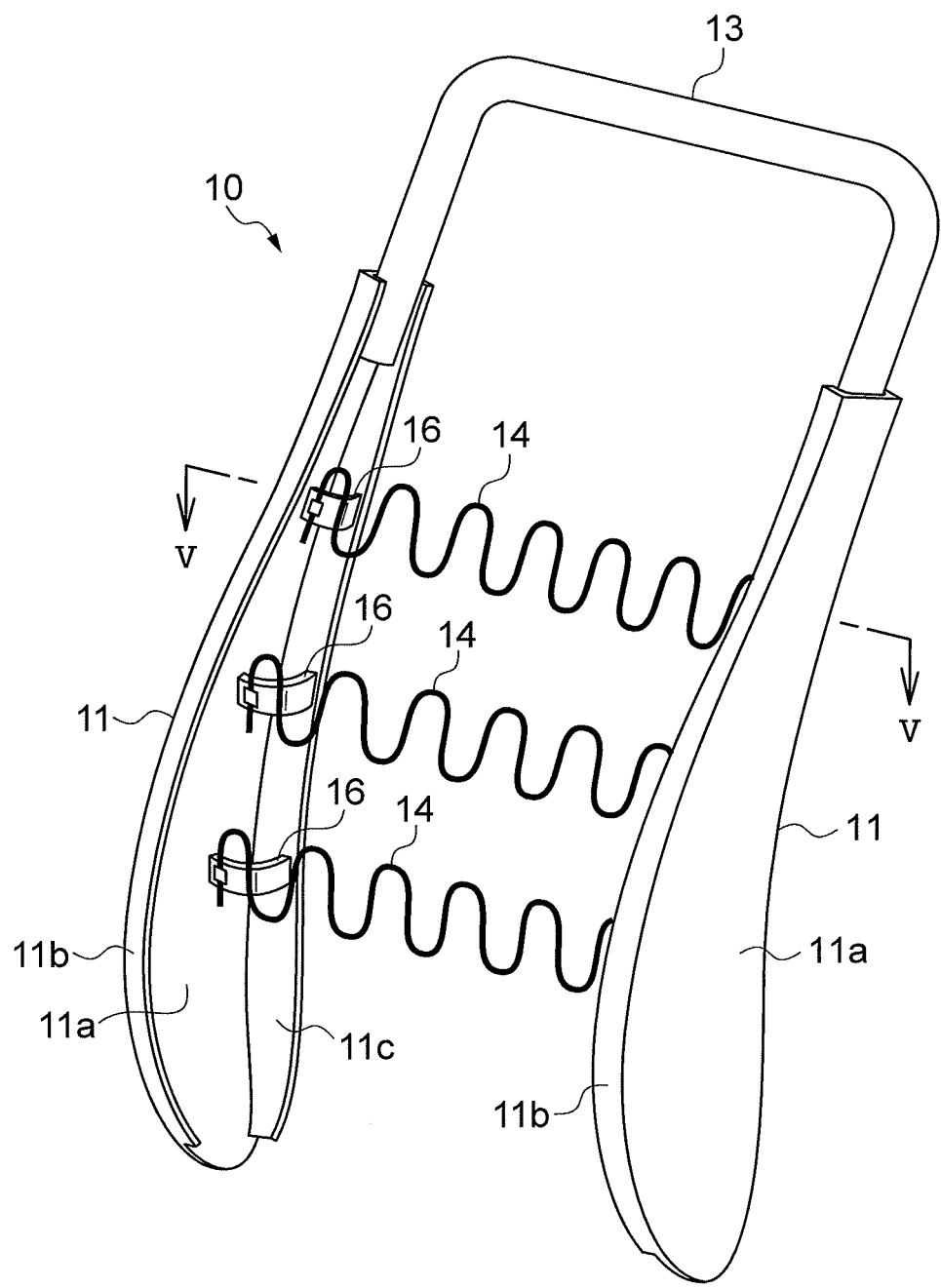
FIG. 2 is a perspective view showing a configuration of a seat back from which a seat pad is removed.
Figure 3:
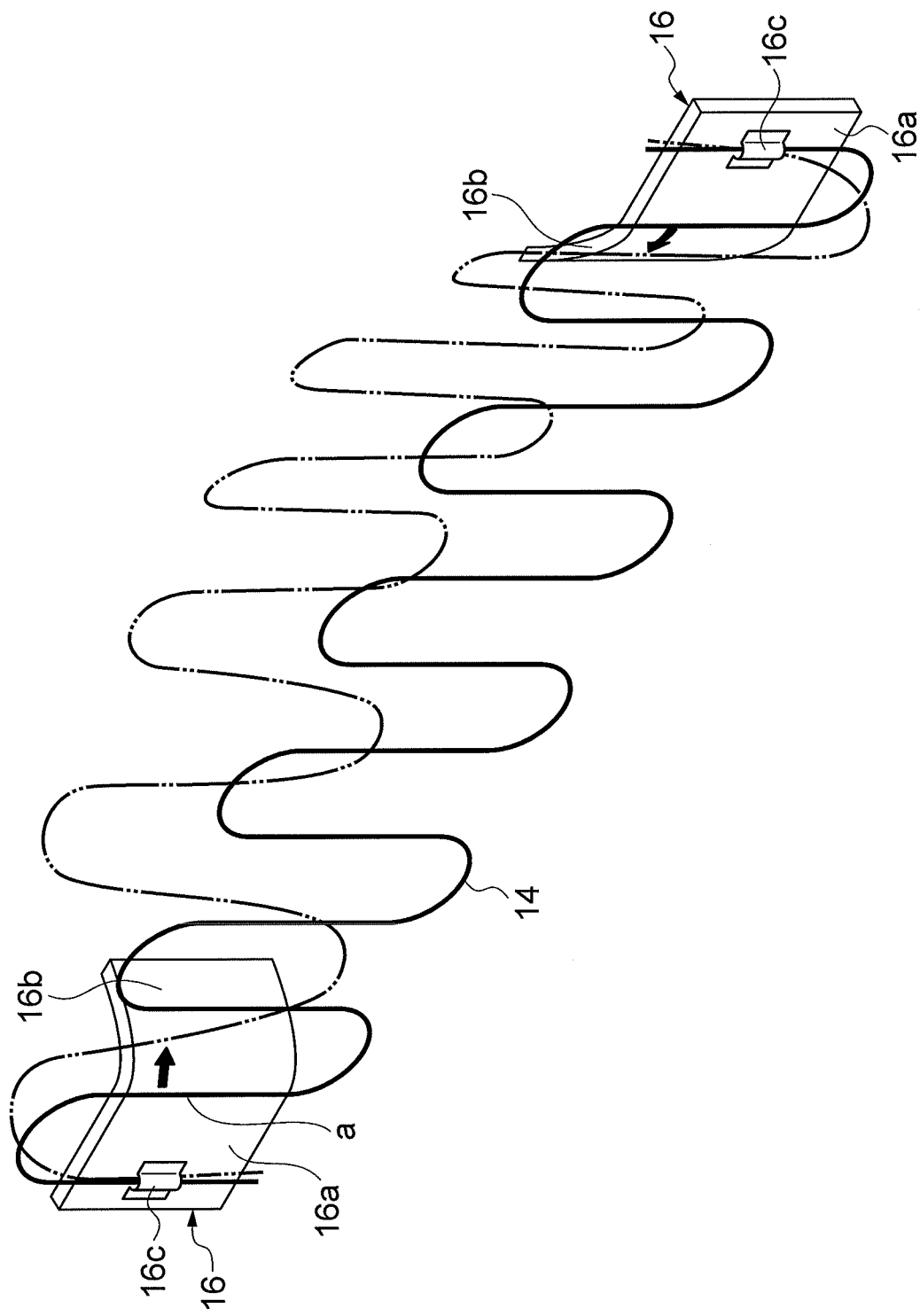
FIG. 3 is a view showing a relationship between a seat back spring and a spring supporting bracket.

FIG. 2 is a perspective view showing the configuration of the seat back from which the seat pad is removed, and FIG. 3 is a partially enlarged view of the seat back shown in FIG. 2. In FIG. 3, in order to facilitate visualization of the drawing, side frame sections 11 are omitted. As shown in FIGS. 2 and 3, in the seat back 3 from which the seat pad 5 is removed, seat back frames 10 which are skeleton members are provided.

The seat back frames 10 are formed in a reversed U-shape, and include a pair of the side frame sections 11 disposed to face each other and linearly formed and an upper frame section 13 that is coupled with an upper end of each side frame section 11 and formed in a reversed U-shape.

The pair of the side frame sections 11 is plane-symmetrically formed and formed to have an approximately U-shaped cross section opened toward the inside of the seat back frames 10.

To give a detailed description, each side frame section 11 has a side wall section 11a that vertically extends, a front wall section 11b that protrudes from a front edge of the side wall section 11a toward the inside of the seat back frames 10, and a back wall section 11c that protrudes from a rear edge of the side wall section 11a toward the inside of the seat back frames 10. Then, the length of the protrusion of the back wall section 11c of each side frame section 11 with respect to the side wall section 11a is longer than the length of the protrusion of the front wall section 11b with respect to the side wall section 11a.

Then, an S-spring 14 is provided in a state of tension between the pair of the side frame sections 11 to elastically support the back (shoulder blade) and the lumbar vertebra region of the occupant.

The S-spring 14 is indirectly fixed to each side frame section 11 via a bracket 16, which will be described later. Further, the S-spring 14 is formed to be bent in an S-shape with a predetermined pitch and have a continuous waveform. Therefore, the S-spring 14 is stretchable by being subjected to a load from the occupant. To give a detailed description, as indicated by a solid line shown in FIG. 3, the S-spring 14 is linearly provided in a state of tension against the width direction of the vehicle in a no-load state in which a load is not applied from the occupant as seen from above the vehicle. On the other hand, as indicated by a two-dot chain line shown in FIG. 3, the S-spring 14 is stretched to be pushed backward in a load application state in which a load is applied from the occupant.

Figure 4:
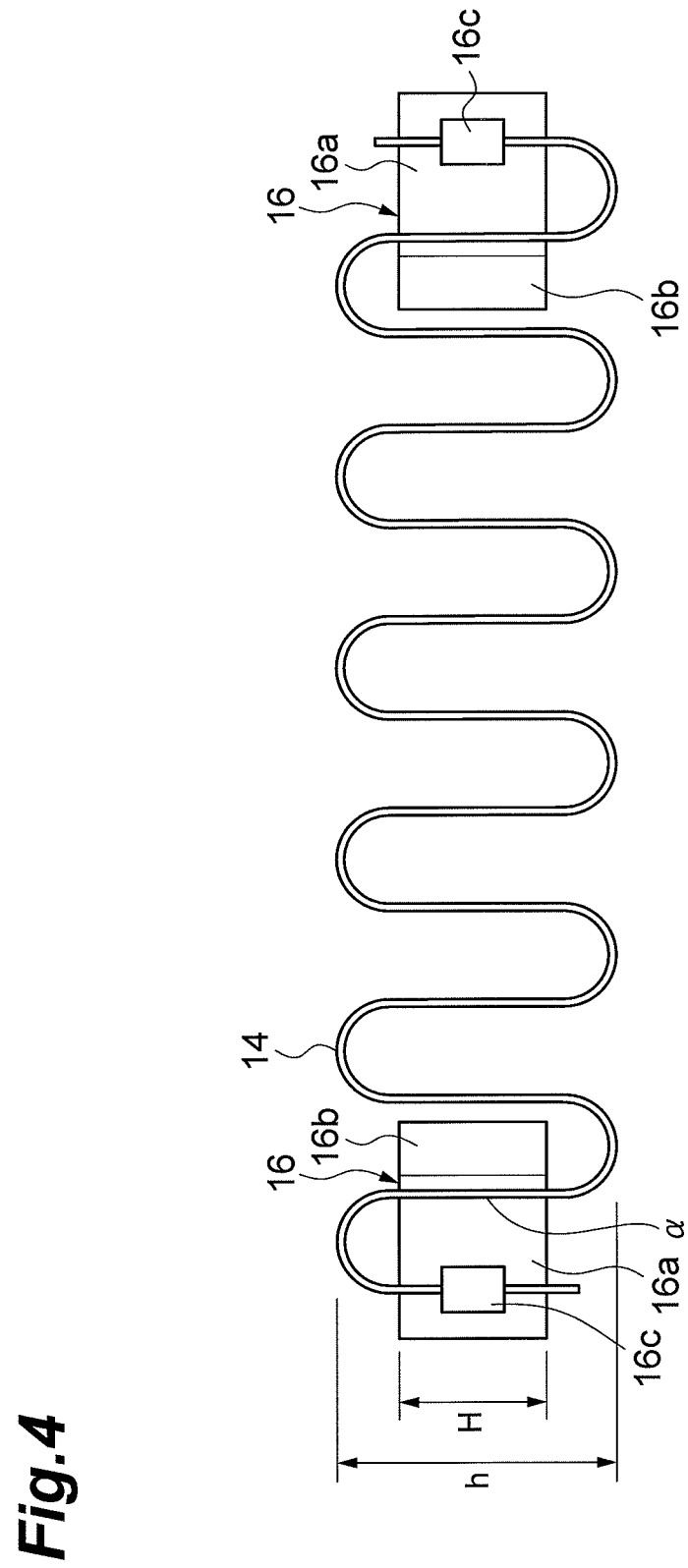
FIG. 4 is a front view showing a part of the seat back.
Figure 5:
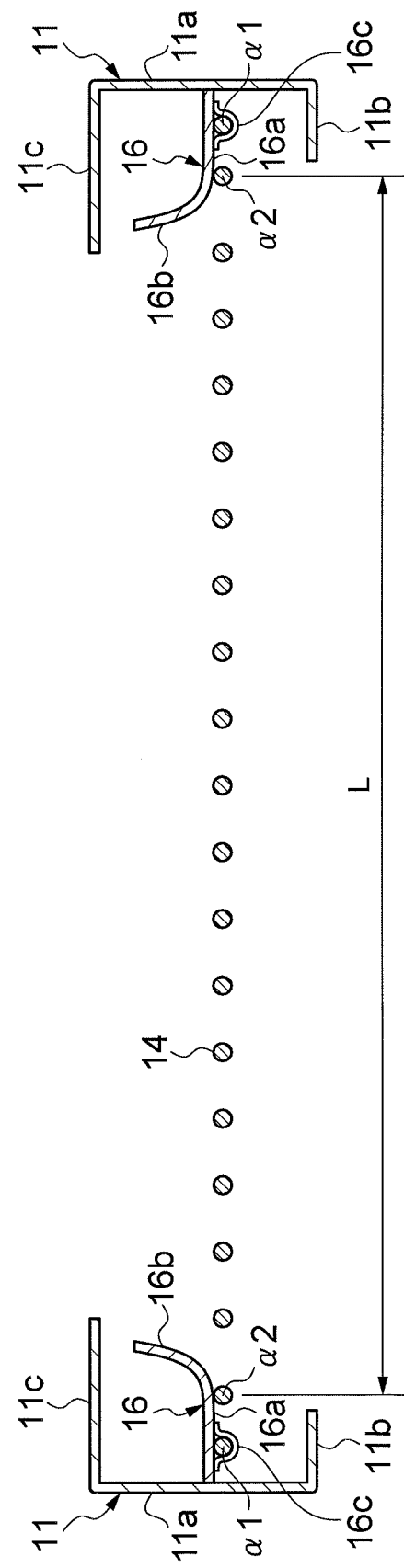
FIG. 5 is a cross-sectional view of FIG. 2 taken along the line V-V in a no-load state.
Figure 6:
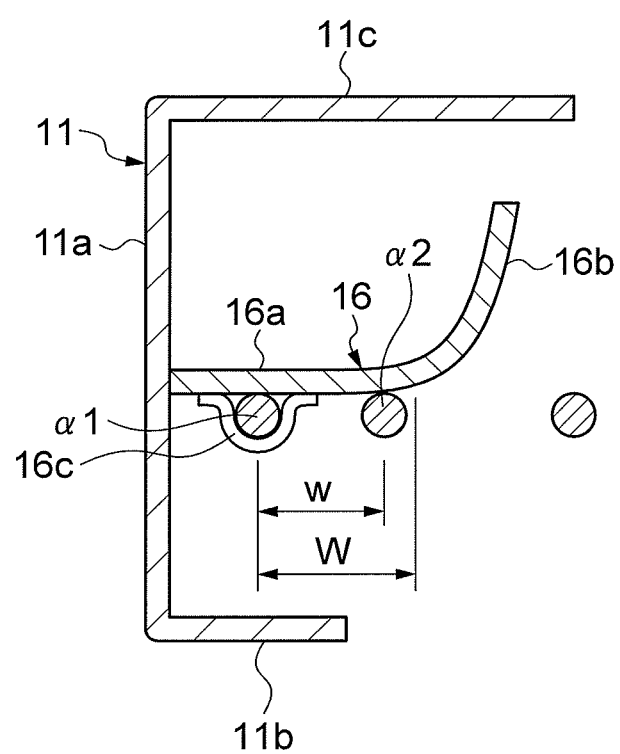
FIG. 6 is a partially enlarged view of FIG. 5.
Figure 7:
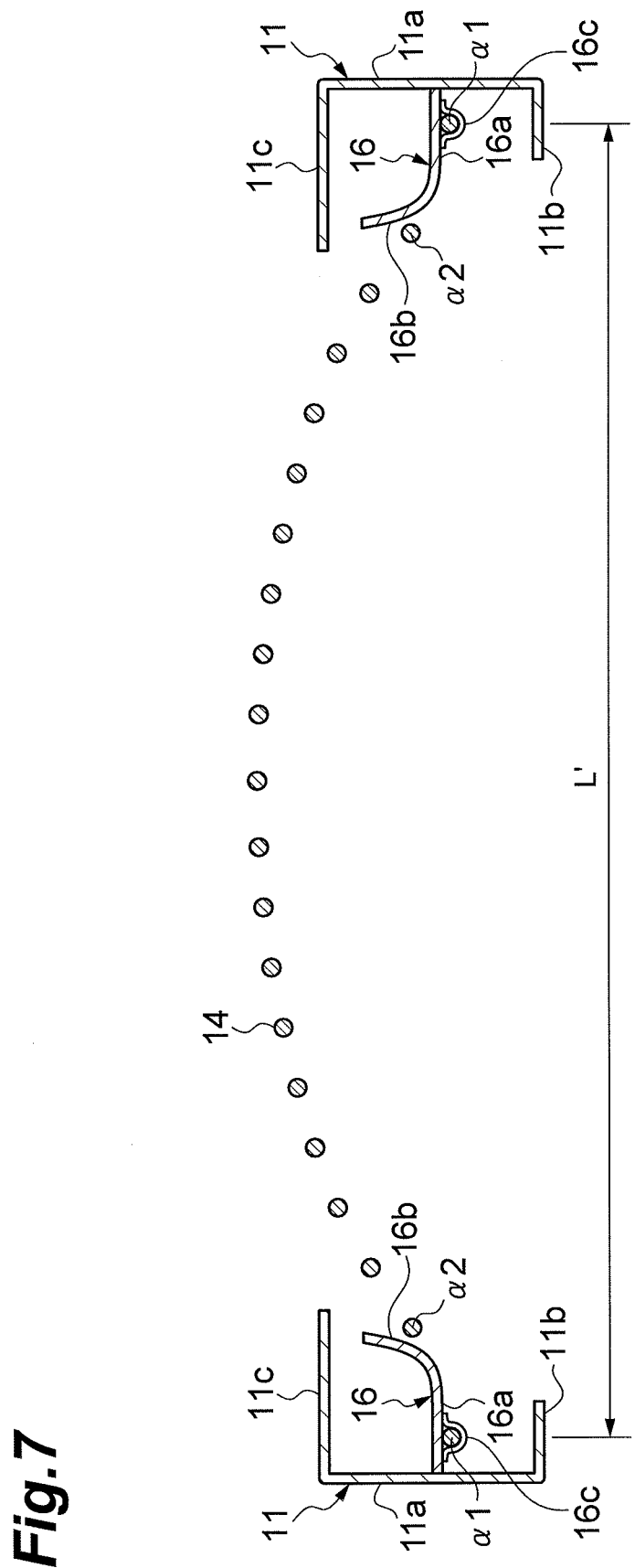
FIG. 7 is a cross-sectional view of FIG. 2 taken along the line V-V at the time of a rear collision.
Figure 8:
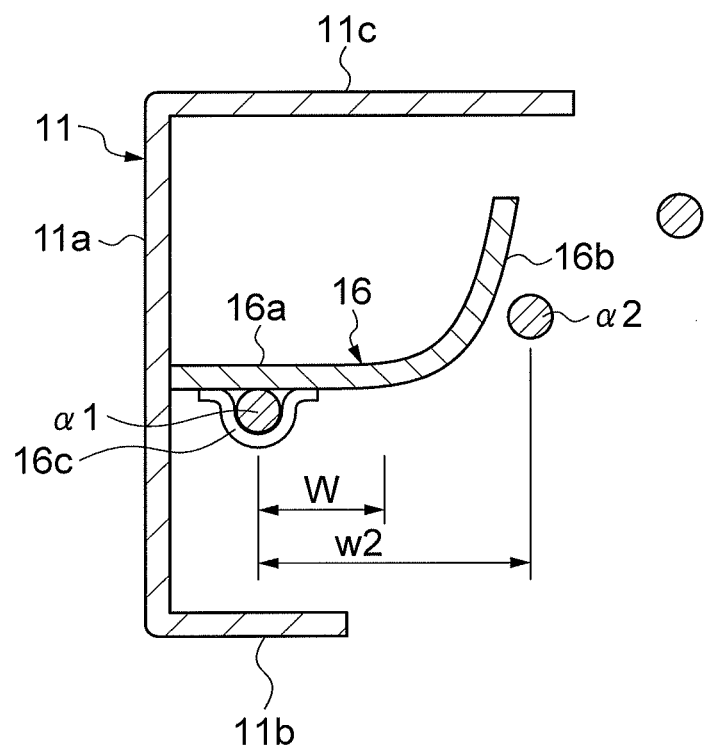
FIG. 8 is a partially enlarged view of FIG. 7.

FIG. 4 is a front view showing a part of the seat back. FIG. 5 is a cross-sectional view of FIG. 2 taken along the line V-V in a no-load state, and FIG. 6 is a partially enlarged view of FIG. 5. FIG. 7 is a cross-sectional view of FIG. 2 taken along the line V-V at the time of a rear collision and FIG. 8 is a partially enlarged view of FIG. 7. As shown in FIGS. 4 to 8, the bracket 16 is formed to have an approximately L-shaped cross section, and include a support section 16a and a guide section 16b.

The support section 16a is a portion which is fixed to the seat back frame 10 and supports the S-spring 14 from behind. One end of the support section 16a is fixed to the side wall section 11a of the side frame section 11. For example, the fixation of the support section 16a to the side wall section 11a can be performed by various methods such as screw clamp and welding. In addition, the support section 16a is formed in a flat plate-like shape and vertically extends from the side wall section 11a to be fixed to the facing side wall section 11a of the side frame section 11.

A fixing section 16c that fixes the end of the S-spring 14 to the end of the support section closed to the side wall section 11a is formed on the front surface of the support section 16a. In order to support the S-spring 14 with the support section 16a from behind, the fixing section 16c fixes the S-spring 14 on the front surface of the support section 16a. Further, any method may be adopted for the fixation of the S-spring 14 by the fixing section 16c. For example, a part of the support section 16a is extruded from the rear side to the front side, and a hole that vertically penetrates is formed between the extruded portion and the support section 16a. Then, the end of the S-spring 14 can be fixed to the support section 16a by inserting the end of the S-spring 14 into the hole. In this case, the portion which is extruded from the support section 16a to form the hole between the front surface of the support section 16a and the extruded portion is the fixing section 16c. Then, in the vertical direction, the S-spring 14 is fixed to the support section 16a by the fixing section 16c so that the center of the support section 16a matches the center of the S-spring 14.

As shown in FIG. 4, a height H of the support section 16a in the vertical direction is shorter than a height h from an upper end to a lower end of the S-spring 14 in the vertical direction. Therefore, the support section 16a discontinuously supports only the center portions α of the S-spring 14. Then, the upper end portion of the S-spring 14 is not supported by the support section 16a and protrudes upward from an upper end of the support section 16a, and the lower end portion of the S-spring 14 is not supported by the support section 16a and protrudes downward from a lower end of the support section 16a.

As shown in FIGS. 5 and 6, the length of the support section 16*a* has a size such that the two center portions α can be supported in a no-load state in which the S-spring 14 is not subjected to a load from the occupant. That is, a width W from the fixing section 16*c* to which the S-spring 14 is fixed to the inner tip end of the seat back frame 10 in the horizontal direction is longer than a width w1 of one pitch of the S-spring 14 in the no-load state. Here, in the no-load state, the center portions α supported by the support section 16*a* are a center portion α1 of the S-spring 14 fixed by the fixing section 16*c* and a center portion α2 adjacent to the center portion α1 on the inside. Accordingly, since the S-spring 14 is supported by the support section 16*a* at two places of the center portion α1 and the center portion α2 in the no-load state, a portion from the center portion α2 of the right end to the center portion α2 of the left end is a deflectable portion L.

However, as described above, the S-spring 14 is stretched by being subjected to a load from the occupant. Therefore, as shown in FIGS. 7 and 8, at the time of a rear collision when a great load acts on the S-spring 14, the S-spring 14 is stretched so as to be pushed backward. At this time, a width w2 of one pitch of the S-spring 14 becomes longer in comparison with the width in a normal state, and the center portion α2 is dislocated from the support section 16*a*. Then, since the S-spring 14 is supported by the support section 16*a* only at one place of the center portion α1, a portion from the center portion α1 of the right end to the center portion α1 of the left end is a deflectable portion L'.

Figure 9:
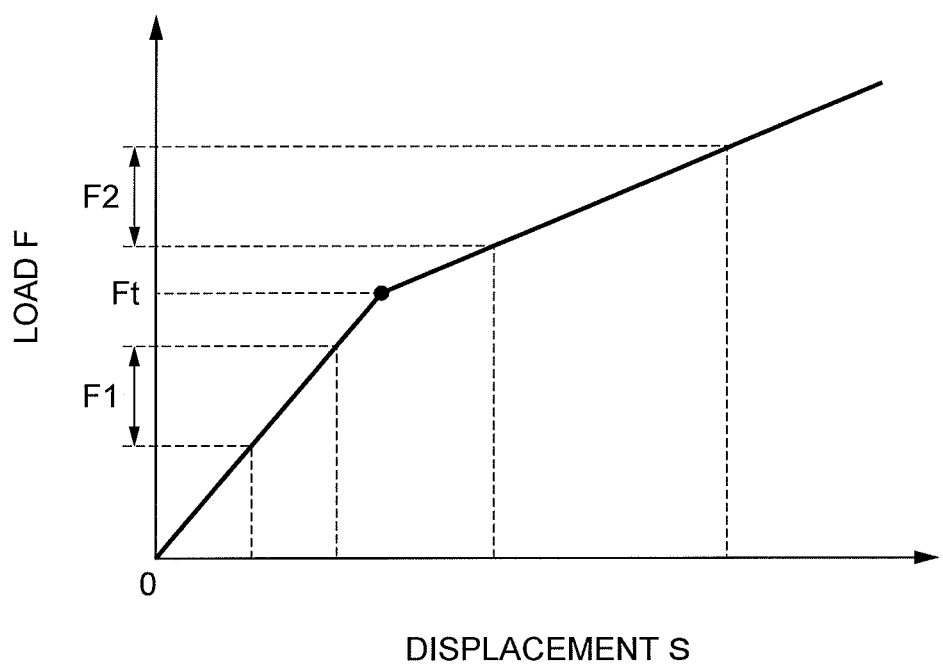
FIG. 9 is a view showing F-S characteristics of an S-spring.

In FIG. 9, the F-S characteristics of the S-spring are shown. In FIG. 9, a vertical axis is a load F which acts on the S-spring 14, and a horizontal axis is displacement S of the S-spring 14. As shown in FIG. 9, when the load which acts on the S-spring 14 is small, the S-spring 14 is supported by the support section 16*a* at two places of the center portion α1 and the center portion α2, and therefore, the S-spring 14 exhibits hard F-S characteristics. On the other hand, when the load which acts on the S-spring 14 is great, the S-spring 14 is supported by the support section 16*a* only at one place of the center portion α1, and therefore, the F-S characteristics of the S-spring 14 are changed to soft F-S characteristics.

As described above, the F-S characteristics of the S-spring 14 are changed by increasing or decreasing the number of the center portions α supported by the support section 16*a* depending on the load which acts on the S-spring 14. Therefore, a threshold load Ft in which the F-S characteristics of the S-spring 14 are changed is set between a load range F1 which is applied to the S-spring 14 in a normal state in which driving is performed normally, and a load range F2 which is applied to the S-spring 14 at the time of a rear collision.

Therefore, the width W from the fixing section 16*c* to which the S-spring 14 is fixed to the inner tip end of the seat back frame 10 in the horizontal direction has a size in which the center portion α2 is dislocated from the support section 16*a* when the set threshold load Ft acts on the S-spring 14.

As shown in FIGS. 5 to 8, the guide section 16*b* is a portion which guides the movement of the center portion α2 dislocated from the support section 16*a*. The guide section 16*b* bends backward from the inner tip end of the seat back frame 10 of the support section 16*a*. A bending angle of the guide section 16*b* with respect to the support section 16*a* may be any angle as long as the angle falls in a range which does not exceed 90°.

In addition, while the guide section 16*b* curves so as to expand inward, it extends backward. Accordingly, the center portion α2 dislocated from the support section 16*a* by the load at the time of a rear collision is guided by the guide section 16*b* and moved backward. On the other hand, when the load at the time of a rear collision is released, the center portion α2 which is dislocated from the support sections 16*a* and moved backward is guided by the guide section 16*b* and returned to the support section 16*a*.

Then, the thus-configured bracket 16 is accommodated in the side frame section 11 surrounded by the side wall section 11*a*, the front wall section 11*b* and the back wall section 11*c*. To give a specific description, since a tip end of the guide section 16*b* is the endmost tip end of the entire bracket 16, the tip end of the guide section 16*b* is disposed closer to the side wall section 11*a* than a line connecting the tip end of the front wall section 11*b* and the tip end of the back wall section 11*c*.

Figure 10:
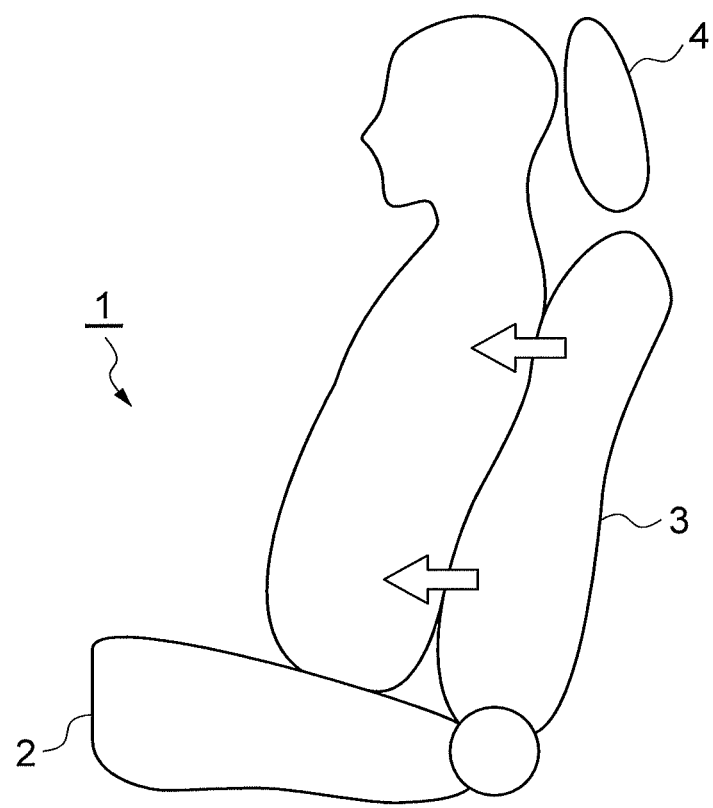
FIG. 10 is a side view showing a normal state.
Figure 11:
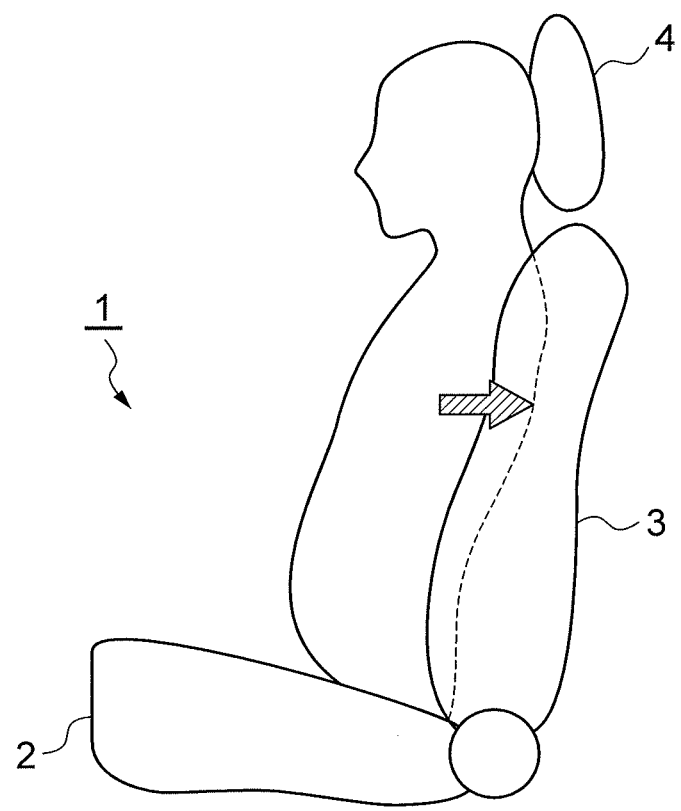
FIG. 11 is a side view showing a state at the time of a rear collision.

Next, the action of the vehicle seat 1 will be described with reference to FIGS. 10 and 11. FIG. 10 is a side view showing a normal state. FIG. 11 is a side view showing a state at the time of a rear collision.

As shown in FIG. 10, since the S-spring 14 is supported by the support section 16*a* at two places of the center portion α1 and the center portion α2 in a normal state in which only a small load of the load range F1 acts on the S-spring 14, the S-spring 14 exhibits hard F-S characteristics. Then, since the S-spring 14 supports the back (shoulder blade) and the lumbar vertebra region of the occupant with a great force, the back (shoulder blade) and the lumbar vertebra region of the occupant are not moved deeply into the seat back 3. At this time, the head of the occupant is held normally at a position separated forward from the head rest 4.

Meanwhile, as shown in FIG. 11, since the support position of the S-spring 14 is widened in the width direction of the vehicle seat 1 in the bracket 16 by supporting the S-spring 14 with the support section 16*a* at only one place of the center portion α1 at the time of a rear collision when a great load of the load range F2 acts on the S-spring 14, the F-S characteristics of the S-spring 14 are changed to soft F-S characteristics. Then, since a force in which the S-spring 14 supports the back (shoulder blade) and the lumbar vertebra region of the occupant is decreased, the back (shoulder blade) and the lumbar vertebra region of the occupant are moved deeply into the seat back 3. At this time, the head of the occupant is moved backward until the head is brought into contact with the head rest 4 due to the impact of the rear collision, and at the same time, the back (shoulder blade) and the lumbar vertebra region of the occupant are moved deeply into the seat back 3 to be moved backward. Therefore, a burden on the occupant is decreased at the time of the rear collision.

In this manner, according to the vehicle seat 1 of the embodiment, the support position of the S-spring 14 is changed by the bracket 16 according to the load. Accordingly, since the deflectable portion (or free length) of the S-spring 14, which is stretched by the load of the occupant, is changed, the characteristics of the S-spring 14 can be changed. In such a manner, by changing the characteristics of the S-spring 14 by the bracket 16, the occupant can be supported with a different supporting force in a normal state and at the time of a rear collision.

In addition, when a load of equal to or greater than the threshold load Ft acts on the S-spring 14 at the time of a rear collision, the center portion α2 is dislocated from the support section 16*a* and therefore, the deflectable portion (or free length) of the S-spring 14 is lengthened by one pitch. Accordingly, since the displacement amount of the S-spring with respect to the load is increased, and the back (shoulder blade) and the lumbar vertebra region of the occupant are moved deeply into the vehicle seat, the burden on the occupant at the time of a rear collision can be reduced.

Moreover, the center portions α of the S-spring 14 can be reliably supported by the support section 16*a*, and the center portion α2 dislocated from the support section 16a at the time of a rear collision can be smoothly returned to the support section 16a by the guidance of the guide section 16b.

Further, since interference between the occupant and the bracket 16 can be prevented by accommodating the bracket 16 in the side frame section 11, deterioration in comfortable riding can be prevented.

Hereinbefore, the preferred embodiment of the invention has been described. However, the invention is not limited to the above embodiment. For example, the number of places where the support section 16a supports the S-spring 14 is not particularly limited, as long as the number of places at the time of a collision is smaller than the number of places in a normal state. For example, the S-spring 14 may be supported by the support section 16a in three places in a normal state and the S-spring 14 may be supported by the support section 16a in two places at the time of a rear collision.

In addition, the support section 16a may have any form as long as the center portions α of the S-spring 14 can be supported. For example, the support section 16a may be curved as the guide section 16b and may be wholly curved without distinction of the support section 16a from the guide section 16b.

Further, the bracket 16 does not always need to be accommodated in the side frame section 11, as long as there is no interference with the occupant, and the bracket may protrude from the side frame section 11.

INDUSTRIAL APPLICABILITY

The invention can be used in a vehicle seat mounted in a vehicle.

REFERENCE SIGNS LIST

1 . . . Vehicle seat, 2 . . . Seat cushion, 3 . . . Seat back, 4 . . . Head rest, 5 . . . Seat pad, 10 . . . Seat back frame, 11 . . . Side frame section, 11a . . . Side wall section of side frame section, 11b . . . Front wall section of side frame section, 11c . . . Back wall section of side frame section, 13 . . . Upper frame section, 14 . . . S-spring, 16 . . . Bracket (spring support section), 16a . . . Support section of bracket, 16b . . . Guide section of bracket, 16c . . . Fixing section of bracket, α (α1, α2) . . . Center portions of S-spring, F1 . . . Load range at normal state, F2 . . . Load range at the time of rear collision, Ft . . . Threshold load, L . . . Deflectable portion at normal state, L' . . . Deflectable portion at the time of rear collision

The invention claimed is:

1. A vehicle seat which is mounted in a vehicle comprising:
   a pair of side frames comprised of a first side frame and a second side frame;
   an S-spring that is provided in a state of tension between the pair of the side frames; and
   a spring support section that is fixed to the side frames,
wherein:
   the S-spring is directly fixed to and supported by the spring support section from behind, and
   the number of places in which the S-spring is supported by the spring support section is decreased at the time of a collision to lengthen a deflectable portion of the S-spring.

2. The vehicle seat according to claim 1,
wherein the spring support section is formed to have a length of equal to or greater than one pitch of the S-spring in a no-load state in which a load is not applied from an occupant and discontinuously supports two or more places of a center portion between an upper end portion and a lower end portion of the curved S-spring.

3. The vehicle seat according to claim 1,
wherein:
   the spring support section is an approximately L-shaped bracket fixed to the first side frame, and
   the spring support section includes:
      a support section that is fixed to the first side frame and supports the S-spring from behind, and
      a guide section that extends and curves backward from a tip end of the support section.

4. The vehicle seat according to claim 2,
wherein:
   the first side frame is formed to have an approximately U-shaped cross section which is opened toward an inside, and
   the spring support section is accommodated in first the side frame.

5. The vehicle seat according to claim 1,
wherein the spring support section extends from the first side frame, to which it is fixed, toward the second side frame.

* * * * *